US011522469B2

(12) United States Patent
Datskos et al.

(10) Patent No.: US 11,522,469 B2
(45) Date of Patent: Dec. 6, 2022

(54) ELECTRIC MACHINES AS MOTORS AND POWER GENERATORS

(71) Applicant: Alliance for Sustainable Energy, LLC, Golden, CO (US)

(72) Inventors: Panagiotis George Datskos, Golden, CO (US); Jochem Weber, Golden, CO (US); Blake Craig Boren, Corvallis, OR (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 77 days.

(21) Appl. No.: 17/112,338

(22) Filed: Dec. 4, 2020

(65) Prior Publication Data

US 2021/0175821 A1   Jun. 10, 2021

Related U.S. Application Data

(60) Provisional application No. 62/944,429, filed on Dec. 6, 2019.

(51) Int. Cl.
*H02N 1/08* (2006.01)
*B81B 3/00* (2006.01)
(52) U.S. Cl.
CPC ..................................... *H02N 1/08* (2013.01)
(58) Field of Classification Search
CPC . H02N 1/08; H02N 2/00; G01L 1/142; B81B 3/00
USPC ...................... 310/309; 322/2 A, 2 R; 290/53
See application file for complete search history.

(56) References Cited

U.S. PATENT DOCUMENTS

| 5,784,190 | A | 7/1998 | Worley |
| 6,549,394 | B1 | 4/2003 | Williams |
| 6,750,590 | B2 * | 6/2004 | Potter ..................... H02N 1/08 310/309 |
| 6,897,537 | B2 | 5/2005 | de los Santos |
| 6,909,220 | B2 * | 6/2005 | Chen ..................... C08L 53/025 310/309 |
| 6,936,994 | B1 | 8/2005 | Gimlan |
| 7,030,536 | B2 * | 4/2006 | Smith .................... H02N 1/006 381/174 |
| 7,038,470 | B1 | 5/2006 | Johnson |
| 7,400,489 | B2 | 7/2008 | Van Brocklin et al. |
| 7,525,213 | B2 | 4/2009 | Nagata et al. |

(Continued)

FOREIGN PATENT DOCUMENTS

| CN | 107228044 A | 10/2017 | |
| JP | 2013188080 A | * 9/2013 | .............. H02N 1/00 |

OTHER PUBLICATIONS

"Capacitor with dielectric as spring", Physics Forums—Homework Help—Introductory Physics Home, Sep. 18, 2017, available at https://www.physicsforums.com/threads/capacitor-with-dielectric-as-spring.925966/, accessed on Nov. 17, 2020, pp. 1-6.

(Continued)

*Primary Examiner* — Burton S Mullins
(74) *Attorney, Agent, or Firm* — Alexandra M. Hall

(57) ABSTRACT

Devices, methods, and systems for electrostatic machines which can act as both an electric motor, converting electrical energy to mechanical energy, and an electric generator, converting mechanical energy to electrical energy, are described. In some embodiments, a spring positioned between two oppositely charged plates may be used as an electric motor and/or electric generator.

17 Claims, 7 Drawing Sheets

(56) References Cited

U.S. PATENT DOCUMENTS

| | | | | |
|---|---|---|---|---|
| 7,557,456 | B2* | 7/2009 | Kornbluh | H02N 2/181 |
| | | | | 310/307 |
| 7,977,923 | B2* | 7/2011 | Pelrine | H02N 2/181 |
| | | | | 320/166 |
| 8,120,229 | B2 | 2/2012 | Huang | |
| 8,193,655 | B2* | 6/2012 | Roberts | H01L 41/22 |
| | | | | 310/309 |
| 8,664,827 | B2* | 3/2014 | Uesugi | H02J 1/12 |
| | | | | 310/309 |
| 8,760,032 | B2* | 6/2014 | Despesse | H02N 1/08 |
| | | | | 310/309 |
| 9,419,544 | B2* | 8/2016 | Kim | H01L 41/113 |
| 9,511,237 | B2* | 12/2016 | Deterre | A61N 1/3756 |
| 9,837,933 | B2* | 12/2017 | Park | H02N 1/04 |
| 10,250,163 | B2* | 4/2019 | Loi | H02N 1/08 |
| 10,309,379 | B2* | 6/2019 | Fujita | H01G 11/56 |
| 10,425,018 | B2* | 9/2019 | Wang | H02N 1/04 |
| 10,651,363 | B2* | 5/2020 | Imai | H01L 41/053 |
| 10,770,637 | B2* | 9/2020 | Park | H01L 41/113 |
| 11,075,358 | B2* | 7/2021 | Kim | H01L 51/0097 |
| 11,114,953 | B2* | 9/2021 | Baik | H02N 1/08 |
| 2004/0140733 | A1* | 7/2004 | Keller | H02N 1/006 |
| | | | | 310/309 |
| 2009/0286910 | A1* | 11/2009 | Bloomfield | C08L 53/025 |
| | | | | 524/269 |
| 2012/0139389 | A1* | 6/2012 | Bohringer | H02K 35/02 |
| | | | | 310/300 |
| 2013/0307371 | A1* | 11/2013 | Sakashita | H02N 1/00 |
| | | | | 310/300 |
| 2014/0145550 | A1 | 5/2014 | Hitchcock et al. | |

OTHER PUBLICATIONS

Bollée, "Electrostatic Motors", Philips Technical Review, 1969, vol. 30, Nos. 6-7, pp. 178-194.

Ge et al., "Dielectric liquids for enhanced field force in macro scale direct drive electrostatic actuators and rotating machinery", IEEE Transactions on Dielectrics and Electrical Insulation, 2016, vol. 23, No. 4, pp. 1924-1934.

Jefimenko et al., "Electrostatic Current Generator Having a Disk Electret as an Active Element", IEEE Transactions on Industry Applications, Nov. 1978, vol. IA-14, No. 6, pp. 537-540.

Kaltseis et al., "Natural rubber for sustainable high-power electrical energy generation", RSC Advances, 2014, vol. 4, No. 53, pp. 27905-27913.

Koh et al., "Maximal energy that can be converted by a dielectric elastomer generator", Applied Physics Letters, 2009, vol. 94, pp. 262902-1-262902-3.

Kornbluh et al., "A scalable solution to harvest kinetic energy", SPIENewsroom, Jul. 2011, pp. 1-3.

LeBrun, "Silicon Sheets Harvest Electricity from Ocean Waves", Aug. 2, 2013, available at https://revolution-green.com/silicon-sheets-harvest-electricity-from-ocean-waves/, accessed on Nov. 11, 2020, pp. 1-7.

McKay et al., "Dielectric elastomer generators that stack up", Smart Materials and Structures, 2015, vol. 24, pp. 1-8.

Niino et al., "High-power and high-efficiency electrostatic actuator", Materials Science, Proceedings IEEE Micro Electro Mechanical Systems, 1993, pp. 236-241.

Otsubo et al., "Dielectric fluid motors", Applied Physics Letters, 1997, vol. 71, No. 3, pp. 318-320.

Rodrigues et al., "Emerging triboelectric nanogenerators for ocean wave energy harvesting: state of the art and future perspectives", Energy & Environmental Science, 2020, vol. 13, pp. 2657-2683.

Trimmer et al., "An operational harmonic electrostatic motor", IEEE Micro Electro Mechanical Systems, Proceedings, 'An Investigation of Micro Structures, Sensors, Actuators, Machines and Robots', 1989, pp. 13-16.

Zhao et al., "Development of a Dielectric-gas-based Single-phase Electrostatic Motor", IEEE Transactions on Industry Applications, May/Jun. 2019, vol. 55, No. 3, pp. 2592-2600.

* cited by examiner

ELECTRIC MACHINES AS MOTORS AND POWER GENERATORS

CROSS-REFERENCE TO RELATED APPLICATIONS

This application claims priority from U.S. Provisional Patent Application No. 62/944,429 filed on Dec. 6, 2019, the contents of which are incorporated herein by reference in their entirety.

CONTRACTUAL ORIGIN

The United States Government has rights in this invention under Contract No. DE-AC36-08GO28308 between the United States Department of Energy and Alliance for Sustainable Energy, LLC, the Manager and Operator of the National Renewable Energy Laboratory.

SUMMARY

An aspect of the present disclosure is a device including a first plate, a second plate, a spring positioned between the first plate and the second plate; and a voltage source electrically connecting the first plate and the second plate, in which the first plate and the second plate are electrically conductive, the spring is characterized by a restoring force, the voltage source is configured to induce a positive charge on the first plate and a negative charge on the second plate, the spring is configured to compress from a first thickness to a second thickness in response to an external force greater than the restoring force, the device has a first state corresponding to the first thickness and a second state corresponding to the second thickness, and the device is configured to generate electrical power by reversible cycling between the first state and the second state. In some embodiments, the first plate and the second plate are made of copper, aluminum, or an alloy thereof. In some embodiments, the spring is at least one coil. In some embodiments, the spring includes at least one of a gel, a liquid, or a solid. In some embodiments, the gel is at least one of a hydrogel, a silicone-based gel, or a dielectric grease. In some embodiments, the liquid is a non-Newtonian fluid, such as silica nanoparticles suspended in polyethylene glycol. In some embodiments, the solid includes at least one of a rubber or a plastic. In some embodiments, the rubber or the plastic include at least one of polyisoprene, polybutadiene, polyisobutylene, or polyurethane. In some embodiments, the spring includes at least one of a gel or a liquid encased in a flexible shell. In some embodiments, the gel includes at least one of a hydrogel, a silicone-based gel, or a dielectric grease. In some embodiments, the liquid includes at least one of mineral oil, silicone oil, hexane, or silica nanoparticles suspended in polyethylene glycol. In some embodiments, the flexible shell includes at least one of polyisoprene, polybutadiene, polyisobutylene, polyurethane, rubber, or plastic. In some embodiments, the voltage source is a battery. In some embodiments, a first support structure is attached to the first plate, a second support structure is attached to the second plate, the first plate is positioned between the first support structure and the spring, and the second plate is positioned between the second support structure and the spring. In some embodiments, the first support structure and the second support structure include a ceramic material, rubber, concrete, plastic, fiberglass, or a combination thereof. In some embodiments, the first support structure includes a first column which is substantially perpendicular to the first plate, the second support structure includes a second column which is substantially perpendicular to the second plate, the second column includes a cavity, the first column is positioned within the cavity, the device is configured to receive the external force parallel to at least one of the first column or the second column, and the first column is configured to move within the cavity as a result of the external force. In some embodiments, the first support structure includes a first hinge comprising a second restoring force, the second support structure comprises a second hinge comprising a third restoring force, the first hinge is configured to use the second restoring force to return the device to the first state after the external force is received, and the second hinge is configured to use the third restoring force to return to device to the first state after the external force is received.

An aspect of the present disclosure is a method including inducing a positive charge on a first plate and a negative charge on a second plate using a voltage source, in which the first plate and the second plate are electrically conductive, and a spring is positioned between the first plate and the second plate, the spring has a first thickness and is characterized by a restoring force. The method includes receiving an external force on the spring, resulting in the spring being compressed to a second thickness and activating the restoring force resulting in the spring returning to the first thickness and cycling the spring between the first thickness and the second thickness, and the using and cycling generates electrical power.

As aspect of the present disclosure is a system including a first device including a first plate, a second plate, a spring positioned between the first plate and the second plate, and a voltage source electrically connecting the first plate and the second plate, in which the first plate and the second plate are electrically conductive, the spring is characterized by a restoring force, the voltage source is configured to induce a positive charge on the first plate and a negative charge on the second plate, the spring is configured to compress from a first thickness to a second thickness in response to an external force greater than the restoring force, the first device has a first state corresponding to the first thickness and a second state corresponding to the second thickness, and the first device is configured to generate electrical power by reversible cycling between the first state and the second state, and a plurality of devices substantially similar to the first device, in which the first device and the plurality of devices are connected forming a chain, a wire is configured to extend through the chain, the chain is configured to receive the external force, and each device is configured to pass the electrical power generated by the device along the wire.

BRIEF DESCRIPTION OF DRAWINGS

Some embodiments are illustrated in referenced figures of the drawings. It is intended that the embodiments and figures disclosed herein are considered to be illustrative rather than limiting.

Figure 1:
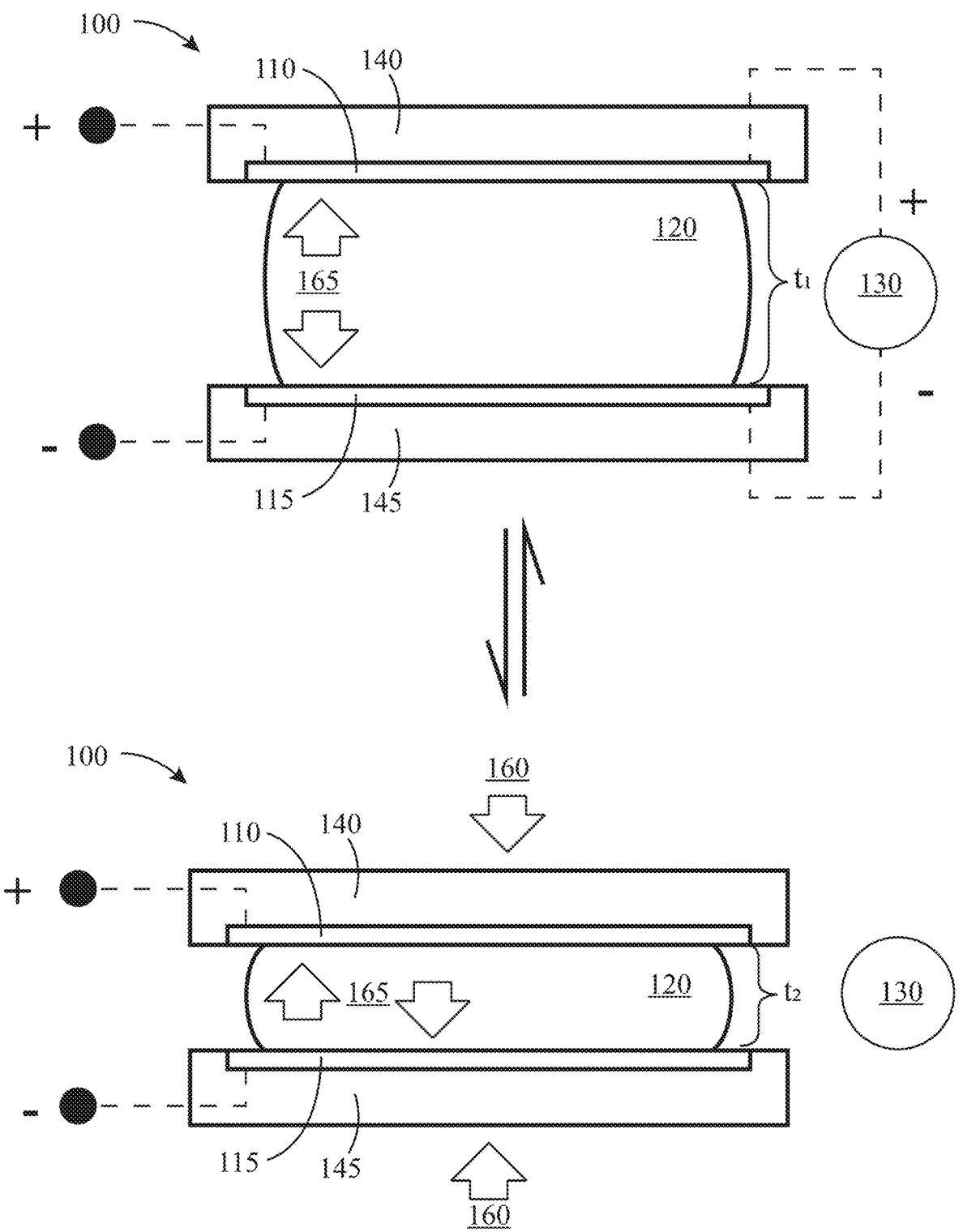
FIG. 1 illustrates a device for converting motion to electrical energy, in a relaxed state (top) and in a compressed state (bottom), according to some embodiments of the present disclosure.

REFERENCE NUMERALS 100 device
110 first plate
115 second plate
120 spring
130 voltage source
140 first support structure
145 second support structure
160 external force
165 restoring force
200 device
400 device
405 first column
410 second column
415 cavity
500 device
505 hinge
600 method
605 inducing
610 receiving
615 activating
620 cycling
700 system
705 wire

DETAILED DESCRIPTION

The embodiments described herein should not necessarily be construed as limited to addressing any of the particular problems or deficiencies discussed herein. References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

The present disclosure relates to a device using oppositely charged conductive plates and a spring to collect kinetic energy from an external force, for example the motion of water due to waves or the motion of a person's body, and convert that kinetic energy to electrical energy. As described herein, exemplary devices may harness an external force to change the distance between the plates, thereby increasing a voltage potential between the plates.

Initially, the plates may be charged by an external voltage source inducing a positive charge on the first plate and a negative charge on the second plate. The two plates being oppositely charged results in the formation of an electrostatic force between the two plates. A spring capable of producing a restoring force is positioned between the two plates. When the device is in this relaxed state, the restoring force is equal to the electrostatic force. After charging the plates, the voltage source may be disconnected from the device.

To begin converting kinetic energy to electrical energy, the device may receive kinetic energy in the form of an external force, which compresses the spring, moving the plates closer together. Being closer together increases the attraction between the plates, thereby increasing the electrostatic force. The restoring force of the spring "pushes back" against this external force and increases the distance between the plates, returning the device to its relaxed state. The spring performs work when forcing the plates further apart, which increases the voltage of the device. This increased voltage may be collected from the device in the form of electrical energy and/or electrical potential. The device may oscillate between the relaxed state and compressed state many times in response to the external force.

FIG. 1 illustrates a device for converting motion to electrical energy, in a relaxed state (top) and in a compressed state (bottom), according to some embodiments of the present disclosure. As shown in FIG. 1, the device 100 includes a first plate 110 and a second plate 115 with a spring 120 positioned between them. The first plate 110 and/or the second plate 115 may be connected to the spring 120 such that a change in thickness of the spring 120 results in movement of the first plate 110 and/or the second plate 115 and/or a movement of the first plate 110 and/or the second plate 115 results in a change in thickness of the spring 120.

As shown in FIG. 1, when the device 100 is in a first relaxed state (top), the first plate 110 and the second plate 115 are separated by a first thickness as shown as $t_1$ and the spring 120 fills the first thickness. The spring 120 has a restoring force 165 which when the device 100 is in the first relaxed state is equal to the electrostatic force (not shown) between the first plate 110 and the second plate 115. The electrostatic force is the attraction between the first plate 110 which has a positive charge and the second plate 115, which has a negative charge. The restoring force 165 of the spring 120 may be characterized by the spring constant of the spring 120, which may be a measure of the resistance of the spring 120 has to being compressed and/or stretched. The first plate 110 may be attached to a first support structure 140 and the second plate 115 may be attached to the second support structure 145.

A voltage source 130 may supply a current to the first plate 110 and the second plate 115, creating a first voltage difference between the two plates when the device 100 is in the first relaxed state as shown in FIG. 1 (top). The voltage source 130 creates a positive charge in the first plate 110 and a negative charge in the second plate 115. After these charges are induced in the first plate 110 and the second plate 115, the voltage source 130 may be turned off or disconnected from the device 100. To clarify, the voltage source 130 may create initial charges in the first plate 110 and second plate 115 and then the device 100 may be disconnected from the voltage source 130 and moved away from the voltage source 130 or the voltage source 130 may be turned off or inactivated.

The electrostatic force between the first plate 110 and the second plate 115 creates a first amount of stored energy and a first voltage in the device 100. The electrostatic force is a result of the first plate 110 having a positive charge and the second plate 115 having a negative charge. The first amount of stored energy in the device 100 may be determined based on the amount of charge in the plates and the initial voltage provided by the voltage source 130.

An external force 160 may be received by the first plate 110 and/or the second plate 115, resulting in the device 100 being compressed to the second state as shown in the bottom of FIG. 1. The external force 160 makes the first plate 110 and/or the second plate 115 move so that the distance between the two is reduced to a second thickness (shown as $t_2$ in the bottom of FIG. 1). As a result of the external force 160, the spring 120 is compressed to the second thickness. Being closer together at the second thickness increases the attraction between the first plate 110 and the second plate 115. This increase in attraction increases electrostatic force. The restoring force 165 of the spring 120 responds to the external force 160 and the electrostatic force by "pushing back" and returning the device 100 to the relaxed state in the top of FIG. 1. The restoring force 165 of the spring 120 performs the work necessary to separate the first plate 110 from the second plate 115, and this work results in an increase in the potential energy of the device 100 (the change in potential energy may be proportional to the change in voltage of the device 100). The positive charge on the first plate 110 and the negative charge on the second plate 115 remains constant as the plates are separated because the device 100 is not connected to the voltage source 130 during separation. The device 100 generates electrical energy by cycling between the relaxed state as shown in the top of FIG. 1 and the compressed state as shown in the bottom of FIG. 1. The device 100 may be said to resonate based on the external force 160.

A first amount of current is produced when the plates are appropriately connected through an external circuit containing a voltage source 130 and a positive charge is induced on the first plate 110 and a negative charge is induced on the second plate 115. A larger amount of current is generated as a result of the device 100 cycling from the relaxed state to the compressed state, as explained below. The amount of current generated is dependent on the spring constant of the spring 120, the total surface area of the plates (first plate 110 and second plate 115), and the change in the distance between the plates (i.e., the difference between the first thickness in the top and the second thickness in the bottom).

Figure 2:
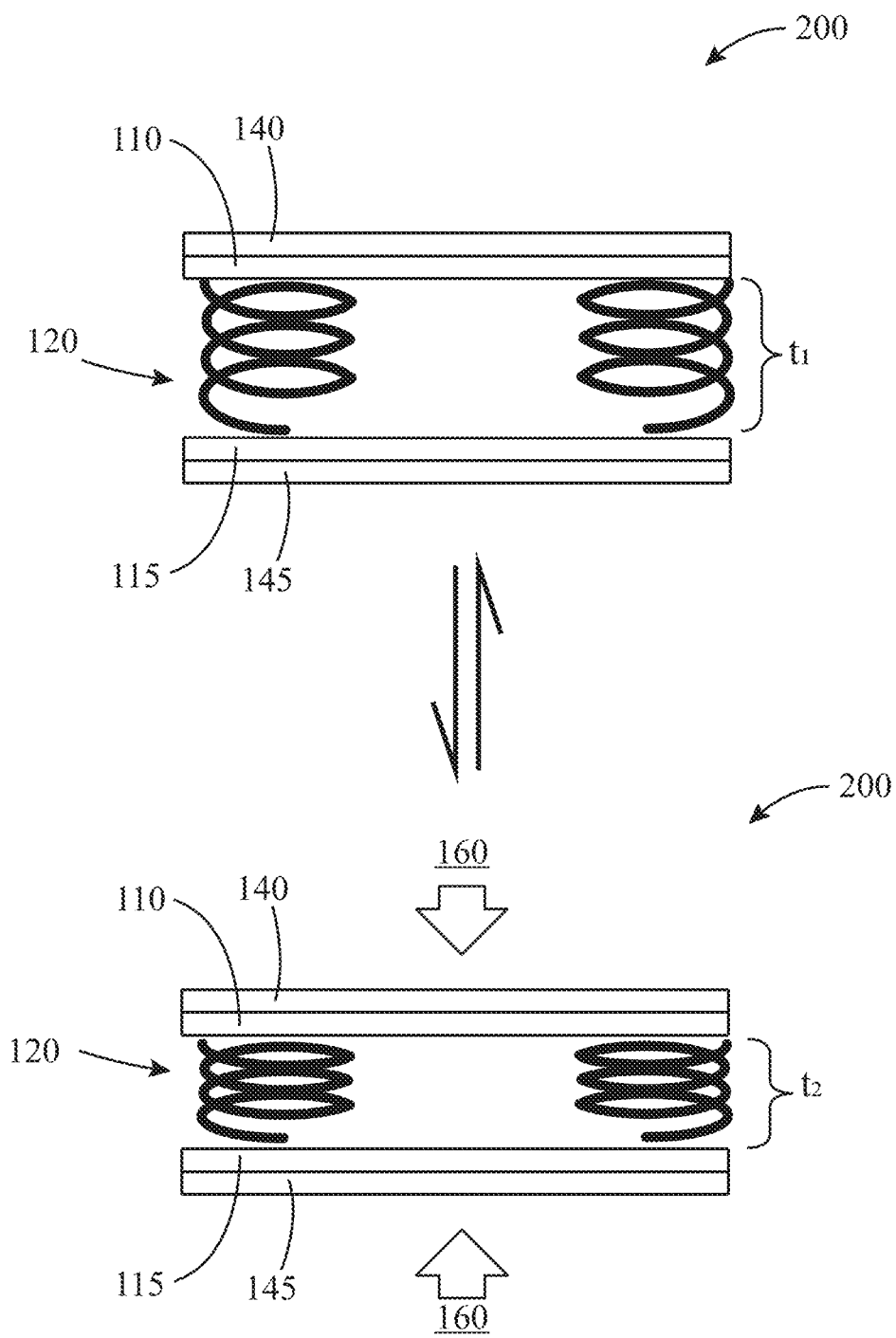
FIG. 2 illustrates device for converting motion to electrical energy using coils, in a relaxed state (top) and in a compressed state (bottom), according to some embodiments of the present disclosure.

FIG. 2 illustrates device for converting motion to electrical energy using coils, in a relaxed state (top) and in a compressed state (bottom), according to some embodiments of the present disclosure. The device 200 shows the first plate 110 connected to a first support structure 140 and the second plate 115 connected to the second support structure. The spring 120 in this device 200 is an array of coils made of dielectric materials. The coils making up the spring 120 may be made of an electrically insulating material, such as polyisoprenes, polybutadienes, polyisobutylenes, polyurethanes, rubbers, plastics, or mixtures thereof. In some embodiments, the coils may have a length made of a wound metal, such as steel, bronze, or titanium with ends connected to the plates that are made of an electrically insulating material such as rubber. FIG. 2 depicts the plates 110 and 115 as rectangular with one coil located in each corner, although the plates could vary in shape and any number of coils could be used. FIG. 2 illustrates a mechanically deformable capacitor utilizing an array of coils with a tunable spring constant as described in some embodiments herein. The device 200 involves a dense array of mechanical coils acting as the spring 120 that can be made from inexpensive insulating materials such as polymers and the spring constant can be adjusted by designing and fabricating the material in a mechanical spring geometry. Advanced manufacturing (i.e., 3D printing) may be used to produce the first support structure 140, the second support structure 145, and the spring 120, which can be coupled with conductive plates (first plate 110 and second plate 115) to form a mechanically deformable capacitor, such as that shown in FIG. 3.

In some embodiments, the device 200 of FIG. 2 may be contained within a dielectric fluid. That is, in some embodiments, the device 200 may be submerged in a dielectric fluid. In some embodiments, this dielectric fluid could be mineral oil, silicone oil, and/or hexane.

Figure 3:
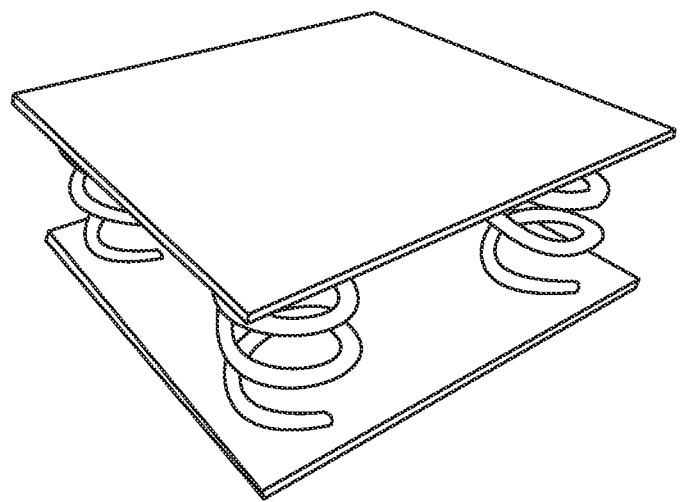
FIG. 3 illustrates a photograph of a device for converting motion to electrical energy using coils, according to some embodiment so the present disclosure.

FIG. 3 illustrates a photograph of a device for converting motion to electrical energy using coils according to some embodiment so the present disclosure. The device shown in FIG. 3 is a 3-D printed prototype of the device 200 shown in FIG. 2. The device shown in FIG. 3 includes four coils as the spring 120, each located near the corners of the first plate 110 and the second plate 115. Although four coils are shown in FIG. 3, any number of coils could be used. FIG. 3 shows a first plate 110 and a second plate 115 connected by four coils, acting as the spring 120. The coils (i.e., the spring 120) may compress or stretch as the plates are moved closer together or further apart. In some embodiments, the coils making up the spring 120 may be would in a circular or spiralized manner (as shown in FIG. 3) or they may be wound in another way.

Figure 4:
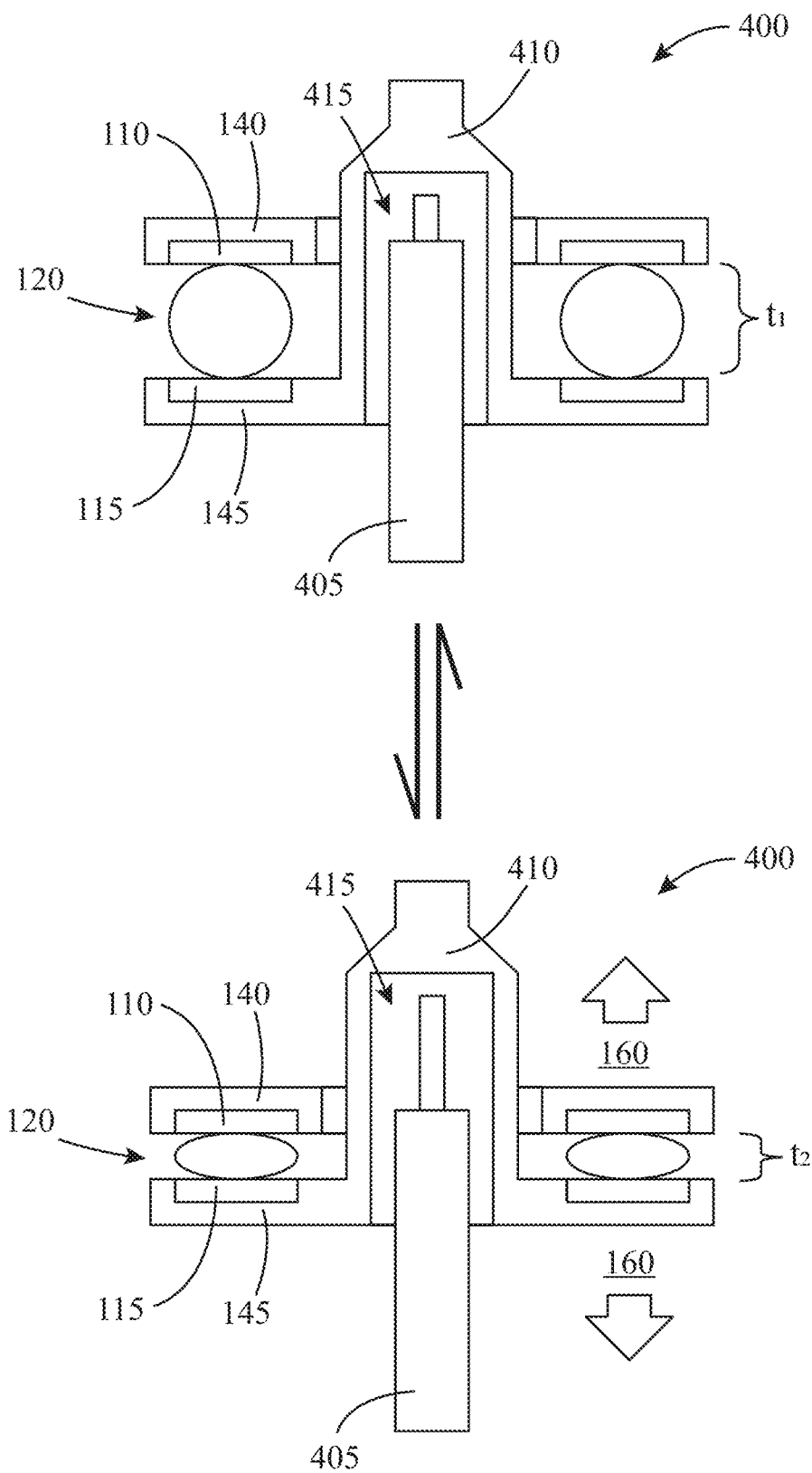
FIG. 4 illustrates a device for converting motion to electrical energy using a pair of concentric columns, in a relaxed state (top) and in a compressed state (bottom), according to some embodiments of the present disclosure.

FIG. 4 illustrates a device for converting motion to electrical energy using a pair of concentric columns, in a relaxed state (top) and in a compressed state (bottom), according to some embodiments of the present disclosure. In some embodiments, for the device 400, the first plate 110 and the second plate 115 are substantially circular in shape, forming rings. A spring 120 is positioned between the plates. The first support structure 140 is attached to the first plate 110 and has a first column 405 which extends substantially perpendicular from the first plate 110. The second support structure 145 is attached to the second plate 115 and has a second column 410 which extends substantially perpendicular from the second plate 115. The second column 410 has a cavity 415. The first column 405 is within the cavity 415 such that the first column 405 and the second column 410 are substantially concentric. The first column 405, the second column 410, and the cavity 415 form a hooking mechanism. When an external force 160 is received by the device 400, the first column 405 and/or the second column 410 move, resulting in the first plate 110 moving closer to the second plate 115 and compressing the spring 120. As shown in the bottom, the device 400 channels the external force 160 into pulling approximately perpendicular to the first plate 110 and the second plate 115. In the bottom of FIG. 4, the external force 160 is shown as being received in two directions, although in some embodiments the external force 160 may only be received from a single direction.

Figure 5:
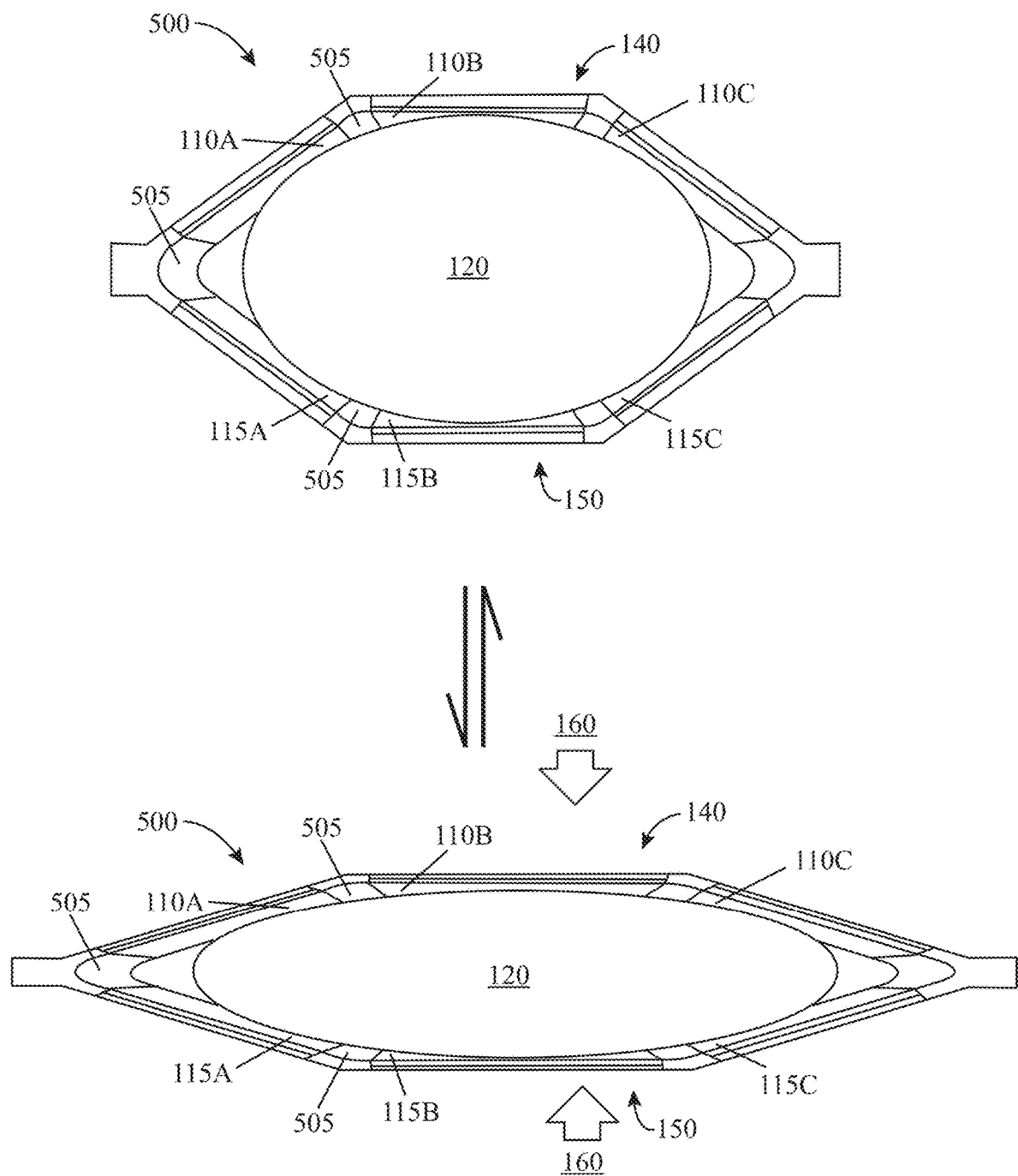
FIG. 5 illustrates a device for converting motion to electrical energy using hinges, in a relaxed state (top) and in a compressed state (bottom), according to some embodiments of the present disclosure.

FIG. 5 illustrates a device for converting motion to electrical energy using hinges, in a relaxed state (top) and in a compressed state (bottom), according to some embodiments of the present disclosure. The device 500 includes multiple first plates 110A, 110B, and 110C and multiple second plates 115A, 115B, and 115C. The number of first plate-second plate pairs shown in FIG. 5 is three, but any number of first plate-second plate pairs could be used, such as four, five, six, seven, eight, nine, ten, etc. The device 500 includes hinges 505 located between each first plate 110A, 110B, and 110C, and second plate 115A, 115B, and 115C. The hinges 505 can move so the device 500 can be stretched and/or flattened as shown in the bottom of FIG. 5 when the device 500 receives an external force 160. The hinges 505 also include a restoring force which helps them return to their resting positions shown in the first relaxed state in the top of FIG. 5. In some embodiments, the hinges 505 may be made of the same material (or materials) as the first support structure 140 and/or the second support structure. In some embodiments the hinges 505 may be made of a metal, fiberglass, plastic, and/or other stiff material. As shown in the bottom of FIG. 5, the device 500 is designed to receive an external force 160 pulling the device 500 and flattening the device 500 and thus compressing the spring 120. The hinges 505 either open or close (based on their position on the device 500) as a result of the external force 160 which forces the device 500 into the second compressed position shown in FIG. 5 (bottom). Then when the external force 160 stops, decreases, or is exceeded by the restoring force 165 (not shown in FIG. 5) of the spring 120 and the restoring force of the hinges 505 themselves, the device 500 returns to the first relaxed state as shown in FIG. 5 (top).

In some embodiments, the first plate 110 and the second plate 115 may be made of electrically conducting material, such as copper, aluminum, or an alloy thereof. The first plate 110 and the second plate 115 may be substantially planar. In some embodiments the first plate 110 and the second plate 115 may be rectangular, triangular, circular, elliptical, or polygonal in shape. In some embodiments the first plate 110 and the second plate 115 may be made of the same material and/or be substantially the same size and/or shape. In some embodiments the first plate 110 and the second plate 115 may be made of different materials and/or may be different in size and/or shape. In some embodiments the first plate 110 and the second plate 115 may be approximately parallel to each other. In some embodiments the first plate 110 and the second plate 115 may not be parallel to each other. In some embodiments, the first plate 110 and the second plate 115 may be less than 1 $m^2$ in size. In other embodiments, the first plate 110 and the second plate 115 may be larger than 1 $m^2$ in size. The size of the plates may depend on the amount of energy to be stored/collected from the device 100.

In some embodiments, the spring 120 may be a material or object capable of being compressed and/or stretched then returning to its initial size and/or shape. The spring 120 may be characterized by a spring constant, which defines the "stiffness" of the spring 120. The spring 120 may be selected based on its spring constant based on the external force 160 the device 100 will be receiving. In some embodiments, the spring 120 may be made of an electrically insulating material. Examples of materials for the spring 120 include polyisoprenes, polybutadienes, polyisobutylenes, polyurethanes, rubbers, plastics, or mixtures thereof. In some embodiments, the spring 120 may be a gel, such as a hydrogel, a silicone-based gel, and/or a dielectric grease. In some embodiments, the spring 120 may be a liquid such as mineral oil, silicone oil, and/or hexane. In some embodiments, the spring 120 may be a non-Newtonian fluid, such as cornstarch in water or silica nanoparticles suspended in polyethylene glycol. In some embodiments, the spring 120 may be a gel or liquid as described above encased in a flexible shell made of polyisoprene, polybutadiene, polyisobutylene, rubber, plastic, or a mixture thereof. In some embodiments, the spring 120 may be an electroactive polymer. As the plates are forced together or apart (and thus an external force 160 in the form of a mechanical force is applied), the spring 120 may be displaced. The restoring force 165 in response to this external force 160 may be used to "capture" electricity. In some embodiments, a support or multiple supports may be provided between the plates to support and/or contain the spring 120. For example, the spring 120 may be contained in a flexible shell or casing. The spring 120 may act as dielectric elastomer generators—essentially stretchable capacitors. In some embodiments, multiple layers of springs 120 may be used. In some embodiments metal organic frameworks may be paired onto the spring 120. In some embodiments, the spring 120 may be connected to the first support structure 140 and the second support structure 145, not the first plate 110 and the second plate 115. In some embodiments, the spring 120 may be made of an electrically conducting material.

In some embodiments, the spring 120 may include shells or casings containing an ionic fluid between the plates. The spring 120 may be approximately the size of the plates or may be smaller than the plates. In some embodiments, there may be multiple shells of ionic fluid between the plates acting as the spring 120. As the plates are pressed together or forced apart the spring 120 may also be adjusted.

In some embodiments, the first plate 110 may be attached to a first support structure 140 and the second plate 115 may be attached to the second support structure 145. The first support structure 140 and the second plate 115 may be made of an insulative material such as rubber, plastic, fiberglass and/or concrete. In some embodiments, the first plate 110 and the second plate 115 are made of the same material. In some embodiments, the first plate 110 and the second plate 115 are made of different materials.

In some embodiments, the voltage source 130 may be a power source capable of inducing a charge difference in the first plate 110 and the second plate 115. In some embodiments, the voltage source 130 may be a battery, such as a 1V, 3V, 5V, or 10V battery. In some embodiments, the voltage source 130 may be used at the site of manufacture of the device 100 to induce the charge difference, then the device 100 may be transported to its location of use. The voltage source 130 may be in electrical communication with the first plate 110 and the second plate 115 by a wire. In some embodiments, the wire may be copper, aluminum, or other conductive material.

In some embodiments, the external force 160 may be applied in a substantially perpendicular direction to the orientation of the first plate 110 and/or the second plate 115. The external force may be a push, pull, pressure, or other force. In some embodiments, the external force 160 may be from water energy, in the form of wave current, ocean current or motion, change in water level from pumping, water flowing, or other similar movement. In some embodiments, the external force 160 may be from wind energy, in the form of wind current, turbulence, air flow, or other similar movement. In some embodiments, the external force 160 may be from kinetic energy, in the form of physical movement, a piston, a pump, a rotor, a rolling, or other similar movement.

Figure 6:
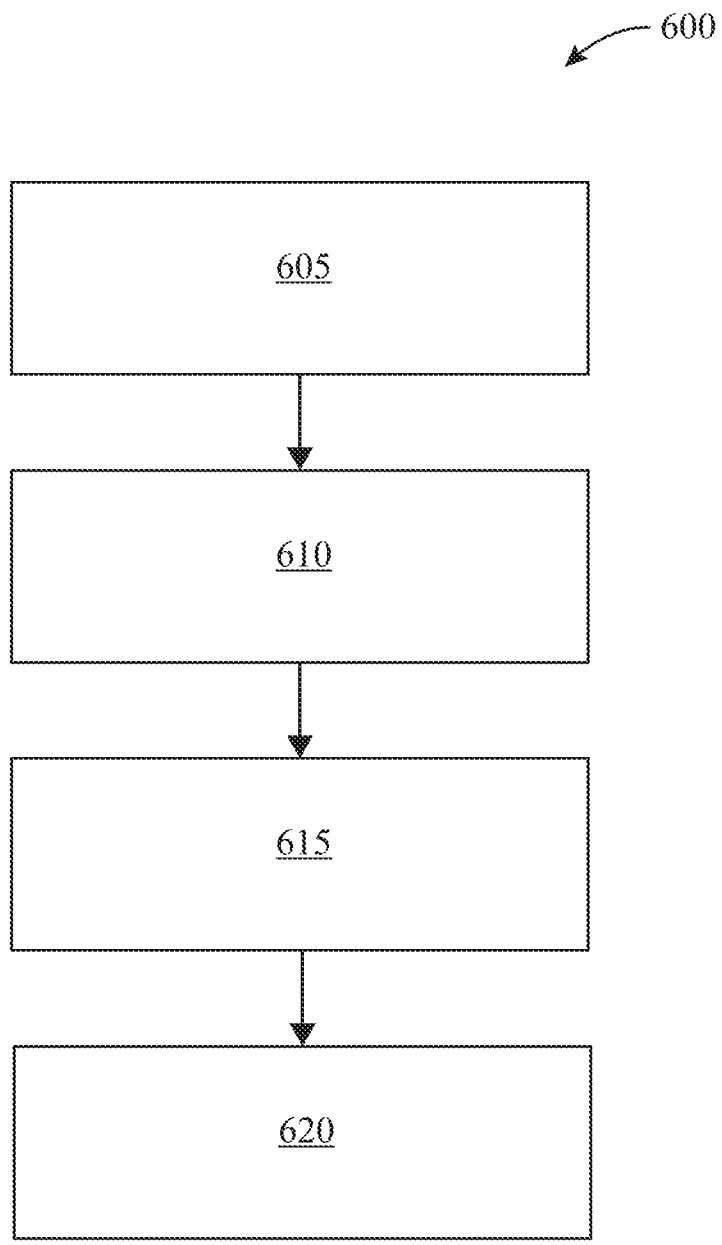
FIG. 6 illustrates a method for converting motion to electrical energy according to some embodiments of the present disclosure.

FIG. 6 illustrates a method for converting motion to electrical energy according to some embodiments of the present disclosure. In some embodiments, the method 600 may utilize the device 100 shown in FIGS. 1A-B.

The method 600 includes inducing 605 a positive charge on the first plate 110 and a negative charge on the second plate 115 using a voltage source 130. The inducing 605 includes removing electrons from the first plate 110 and adding electrons (including, perhaps, those removed from the first plate 110) to the second plate 115. The inducing 605 creates an electric field and a voltage difference between the first plate 110 and the second plate 115. The inducing 605 results in an amount of energy being stored in the device 100. The voltage source 130 may be a battery (such as a 1V, 5V, or 10V battery) or other power source capable of performing the inducing 600. After the inducing 600 the device 100 may be disconnected from the voltage source 130 and/or the voltage source 130 may be turned off.

The electric field of the first plate 110 and the second plate 115 depends on the charge of the plates, the area of the plates, and the dielectric strength of the spring 120. In device 100 the electric field between the two plates is:

$$E = \frac{Q}{2A\varepsilon} \quad (1)$$

where Q is the charge on the plates, A is the area of the plates, and ε is the dielectric strength of the spring 120. The electrostatic force between the two plates is given by:

$$F = QE = \frac{Q^2}{2A\varepsilon} = \varepsilon A \frac{V}{2x^2} \quad (2)$$

where V is the applied voltage and x is the distance between the two plates. In the relaxed state as shown in FIG. 1 (top), the restoring force 165 (defined by k x, where k is the spring constant of the spring 120) is equal to the electrostatic force and the device 100 may be said to be an equilibrium.

$$\frac{Q^2}{2A\varepsilon} = kx \quad (3)$$

When the voltage source 130 supplies an applied voltage to the device 100, the device 100 is used as a motor and the applied voltage will result in a separation distance, x, (i.e., the first thickness of the spring 120 shown in FIG. 1 (top)) which is given by:

$$x = \left(\frac{\varepsilon A V^2}{2k}\right)^{1/3} \quad (4)$$

In some embodiments, inducing 605 may result in a movement of the first plate 110 and/or the second plate 115, as the plates and the spring 120 respond to the applied voltage. This movement results in the spring 120 reaching the first thickness, when the plates are charged.

The method 600 includes receiving 610 an external force 160 on the first plate 110 and/or the second plate 115. The external force 160 results in the first plate 110 and the second plate 115 moving closer together and compressing the spring 120 from a first thickness to a second thickness. The receiving 610 causes the electric field between the first plate 110 and the second plate 115 to increase and results in an electrostatic force. The external force 160 may be provided by ocean current, wind current, or movement of the device 100 by an external machine or process. The external force 160 may be greater than the restoring force 165 when it is applied, resulting in the compression of the spring 120.

The method 600 includes activating 615 the restoring force 165 of the spring 120, resulting in the dielectric expanding or stretching from the second thickness back to the thickness. The activating 615 may be a result of a removal or ceasing of the external force 160 or a reduction in the magnitude of the external force 160. The activating 615 results in the restoring force 165 being greater than the external force 160, and thus the expansion of the spring. The first plate 110 and/or the second plate 115 move further apart as a result of the activating 615. In some embodiments, the activating 615 may result in the spring 120 extending beyond the first thickness as the device 100 reaches a kind of equilibrium or resonance between the external force 160 and the restoring force 165. The activating 615 supplies work to the device 100 to separate the first plate 110 and the second plate 115. This work (and increase in distance between the first plate 110 and the second plate 115) results in an increase in the potential energy stored in the device 100.

When the present disclosure is used as a generator a mechanical force in the separation, x, will produce a voltage, V, given by:

$$V = \left(2\frac{kx^3}{\varepsilon A}\right)^{1/2} \quad (5)$$

The method 600 includes cycling 620 between the relaxed state as shown in FIG. 1 (top) and the compressed state as shown in FIG. 1 (bottom) of the device 100. That is, the cycling 620 includes the spring alternating between the first thickness and the second thickness. The cyclic change in distance between the first plate 110 and the second plate 115 results in an increase in the potential energy of the device 100, which can be removed from the device 100 in the form of electrical energy.

In some embodiments, the exemplary devices of the present disclosure may act first as an electric motor (converting electrical energy provided by the voltage source to mechanical energy in the form of the restoring force 165 of the spring 120) and then an electric generator (converting mechanical energy provided by the external force 160 to electrical energy which can be harvested). The spring 120 may keep electrodes (i.e., the first plate 110 and the second plate 115) at a voltage potential and distance apart by opposing the electric force generated by the opposing charges of the plates. The electric force is approximately equivalent to the restoring force 165 at equilibrium. The spring 120 acts as the rotor of the generator/motor and is located between a pair of conducting plates (first plate 110 and second plate 115). The conducting plates constitute the stator of a generator and/or motor. The electric field is produced by charges on each plate of the stator.

The exemplary devices of the present disclosure are electromechanical devices utilizing the electrostatic force generated by capacitive power transfer between electrodes (i.e., the first plate 110 and the second plate 115). In the present disclosure, the plates act as electrodes. The exemplary devices described herein can act as motors or generators. When voltage is applied to the plates (which are acting as stator electrodes), the electrical force acts on the spring (which is acting as the rotor) to minimize the distance between the plates. The electric field between the plates increases quadratically with the decrease of distance, producing an electrostatic force, thereby acting as a motor. However, when mechanical energy is applied to the spring (i.e., the rotor) to decrease or increase the distance between the plates (i.e., stator electrodes) the charges on the plates varies correspondingly to balance the mechanical force thereby acting as a generator.

Figure 7:
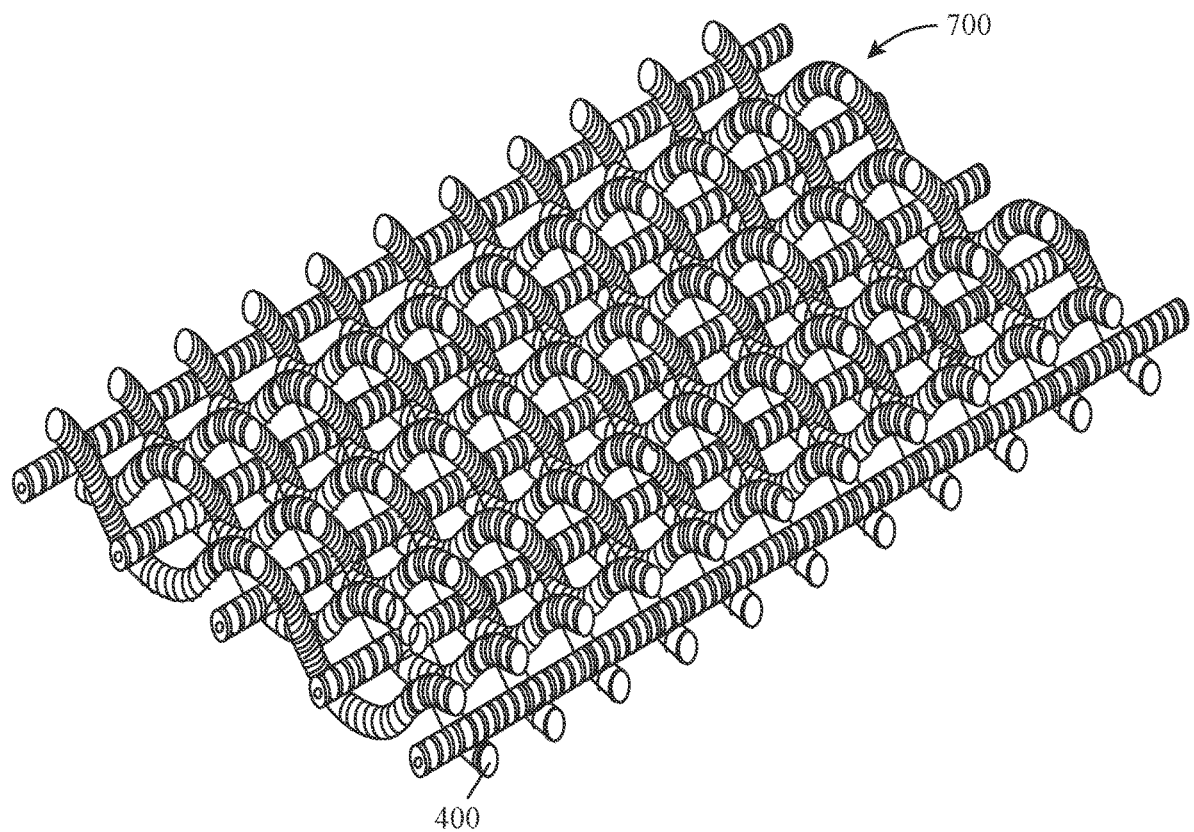
FIG. 7 illustrates a system of devices for converting motion to electrical energy, according to some embodiments of the present disclosure.

FIG. 7 illustrates a system of devices for converting motion to electrical energy, according to some embodiments of the present disclosure. The system 700 includes a plurality of devices (shown as the device for converting motion to electrical energy using a pair of concentric columns 400, although any embodiment of the present disclosure may be used) connected end to end, forming a chain, which may then be woven together to form a fabric or material. The individual devices 400 may be very small (<1 cm$^3$ in volume) in the system 700. A wire 705 or other conductive means may extend through the chain, providing a means for charging the plates in each device 400 and a means for collecting the electrical energy generated as a result of the external force (not shown in FIG. 7). In some embodiments, the wire 705 may be copper, aluminum, or another conductive metal.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

The invention claimed is:

1. A device comprising:
a first plate;
a second plate;
a spring positioned between the first plate and the second plate;
a voltage source electrically connecting the first plate and the second plate;
a first support structure comprising a first column which is substantially perpendicular to the first plate and attached to the first plate; and
a second support structure comprising a second column which is substantially perpendicular to the second plate and attached to the second plate; wherein:
the first plate and the second plate are electrically conductive,
the first plate is positioned between the first support structure and the spring,
the second plate is positioned between the second support structure and the spring,
the second column comprises a cavity,
the first column is positioned within the cavity,
the spring is characterized by a restoring force,
the voltage source is configured to induce a positive charge on the first plate and a negative charge on the second plate,
the spring is configured to compress from a first thickness to a second thickness in response to an external force greater than the restoring force,
the device is configured to receive the external force parallel to at least one of the first column or the second column,
the first column is configured to move within the cavity as a result of the external force, the device has a first state corresponding to the first thickness and a second state corresponding to the second thickness, and
the device is configured to generate electrical power by reversible cycling between the first state and the second state.

2. The device of claim 1, wherein the first plate and the second plate comprise copper, aluminum, or an alloy thereof.

3. The device of claim 1, wherein the spring comprises a coil.

4. The device of claim 1, wherein the spring comprises at least one of a gel, a liquid, or a solid.

5. The device of claim 4, wherein the gel comprises at least one of a hydrogel, a silicone-based gel, or a dielectric grease.

6. The device of claim 4, wherein the liquid comprises a non-Newtonian fluid.

7. The device of claim 6, wherein the non-Newtonian fluid comprises silica nanoparticles suspended in polyethylene glycol.

8. The device of claim 4, wherein the solid comprises at least one of a rubber or a plastic.

9. The device of claim 8, wherein the rubber or the plastic comprise at least one of polyisoprene, polybutadiene, polyisobutylene, or polyurethane.

10. The device of claim 1, wherein the spring comprises at least one of a gel or a liquid encased in a flexible shell.

11. The device of claim 10, wherein the gel comprises at least one of a hydrogel, a silicone-based gel, or a dielectric grease.

12. The device of claim 10, wherein the liquid comprises at least one of mineral oil, silicone oil, hexane, or silica nanoparticles suspended in polyethylene glycol.

13. The device of claim 10, wherein the flexible shell comprises at least one of polyisoprene, polybutadiene, polyisobutylene, polyurethane, rubber, or plastic.

14. The device of claim 1, wherein the voltage source is a battery.

15. The device of claim 1, wherein the first support structure and the second support structure comprise a ceramic material, rubber, concrete, plastic, fiberglass, or a combination thereof.

16. The device of claim 1, wherein:
the first support structure comprises a first hinge comprising a second restoring force,
the second support structure comprises a second hinge comprising a third restoring force,
the first hinge is configured to use the second restoring force to return the device to the first state after the external force is received, and
the second hinge is configured to use the third restoring force to return to device to the first state after the external force is received.

17. A method comprising:
inducing a positive charge on a first plate and a negative charge on a second plate using a voltage source; wherein:
the first plate and the second plate are electrically conductive, and
a spring is positioned between the first plate and the second plate,
the spring comprises a first thickness and is characterized by a restoring force,
receiving an external force on the spring, resulting in the spring being compressed to a second thickness; and
activating the restoring force resulting in the spring returning to the first thickness; and
cycling the spring between the first thickness and the second thickness; wherein:
the cycling generates electrical power
a first support structure comprising a first column which is substantially perpendicular to the first plate is attached to the first plate,
a second support structure comprising a second column which is substantially perpendicular to the second plate is attached to the second plate,
the first plate is positioned between the first support structure and the spring,
the second plate is positioned between the second support structure and the spring,
the second column comprises a cavity,
the first column is positioned within the cavity,
the device is configured to receive the external force parallel to at least one of the first column or the second column, and
the first column is configured to move within the cavity as a result of the external force.

* * * * *